Dec. 30, 1924.

R. C. OSGOOD

CLUTCH

Filed June 24, 1919

1,521,042

Inventor:
Robert C. Osgood.
by
Atty.

Patented Dec. 30, 1924.

1,521,042

UNITED STATES PATENT OFFICE.

ROBERT C. OSGOOD, OF CLAREMONT, NEW HAMPSHIRE, ASSIGNOR TO SULLIVAN MACHINERY COMPANY, A CORPORATION OF MASSACHUSETTS.

CLUTCH.

Application filed June 24, 1919. Serial No. 306,404.

*To all whom it may concern:*

Be it known that I, ROBERT C. OSGOOD, a citizen of the United States, residing at Claremont, in the county of Sullivan and State of New Hampshire, have invented certain new and useful Improvements in Clutches, of which the following is a full, clear, and exact specification.

My invention relates to clutches.

It has for its object to provide an improved and simplified means for retaining a clutch in its adjusted position, and one especially adapted to prevent tampering with its adjustment. A further object of my invention is to provide an improved and simplified sealing means for a clutch, especially adapted to use in connection with a friction clutch for mining machines, whereby an operator of such a machine is unable improperly to adjust the friction and thereby endanger the machine mechanism, without breaking the sealing mechanism and thereby being detected by the mine inspectors.

In the accompanying drawings I have shown for purposes of illustration two embodiments which my invention may assume in practice.

In these drawings,—

Figure 1:
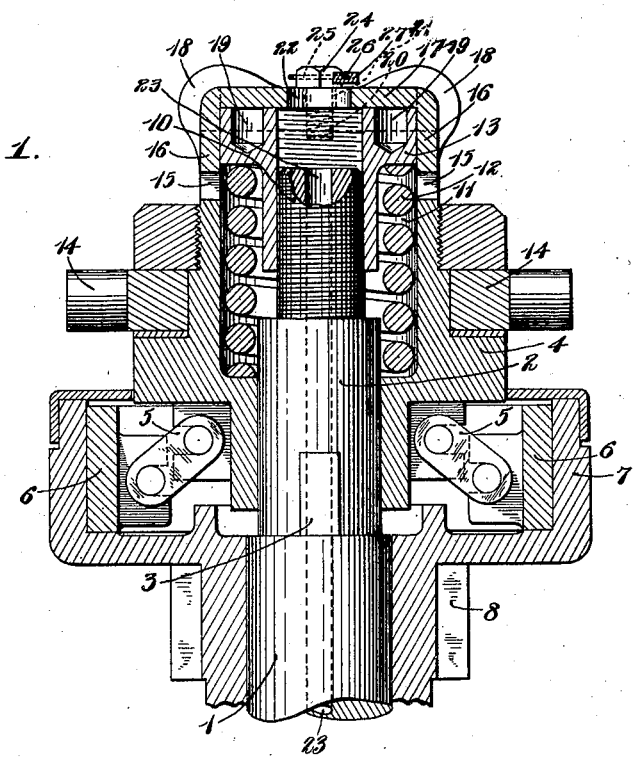
Fig. 1 is a vertical sectional view of a friction mechanism equipped with one form of my improvement.

In illustrating these forms of my invention, it will be observed that I have shown the same applied to a friction clutch mechanism of a well known type including a longitudinal member, herein a driving shaft 1, having a reduced portion 2 thereon to which is splined, as at 3, a reciprocable clutch member 4, herein a friction controlling member, carrying radially disposed toggle links 5 pivotally connected therewith and with segmental members 6 engageable with the inner periphery of a driven member 7 freely rotatable on the shaft 1 and herein, as usual, having gear teeth 8 cut therein. As shown, the shaft 1 is also provided with a threaded portion 10 on its upper end above the reduced portion 2, and the member 4 is provided with an upstanding sleeve forming a chamber 11, receiving a coiled spring 12, the tension of which is adjusted by means of an adjusting nut 13 disposed in and closing the upper end of the chamber, and threaded on the portion 10 of the shaft; the construction being such that when the member 4 is raised or lowered, as by the movement of arms 14 thereon by a suitable shipper, the members 6 are forced into or out of engagement with the member 7, thereby to connect or disconnect the latter and the shaft.

Figure 2:
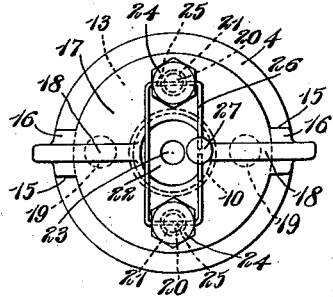
Fig. 2 is a plan view of the sealing means thereon.
Figure 3:
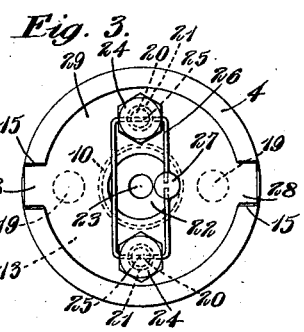
Fig. 3 is a plan view of a modified form of my invention.
Figure 4:
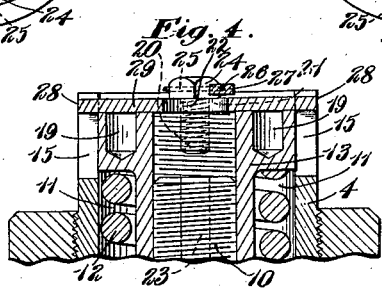
Fig. 4 is a partial vertical sectional view of this modified construction.

In the form of my improved construction shown in Figs. 1 and 2, it will be observed that the sleeve on the movable controlling member 4 is provided with one or more slots, herein two oppositely located vertically disposed slots 15, in its upper end, and that disposed over the nut 13 and having depending portions 16 slidable and interlocked in these slots, is a retaining member 17, herein of substantially disk-like form and adapted to overlie the nut and provided with upstanding ribs 18 for strengthening purposes. As shown, the nut 13 is provided, in a plane substantially at right angles to the plane of its usual perforations 19 for receiving its adjusting wrench, with a pair of threaded openings 20, while the member 17 is provided with registering openings 21 which may or may not be threaded, as desired. Herein, the member 17 also has an axially disposed opening 22 therein forming an oil inlet communicating with the interior of the nut and an axial oil duct 23 provided throughout the length of the shaft 1. It will also be observed that disposed in the openings 20, 21 are screws 24, each having a lateral opening 25 in its head in such a manner as to enable a wire 26 to extend therethrough and connect the same, the ends of the wire preferably being connected by a usual car seal 27. In Figs. 3 and 4, it will be observed that I have shown a construction of substantially the construction described with the exception that instead of the depending members 16 receivable in the slots 15 on the member 4, the upper slotted portion of the latter member is extended further upward so that it will receive oppositely located lateral extensions 28 on a disc-shaped member 29 corresponding to the member 17. By this construction it will be observed that it is possible to simplify and cheapen the form of the locking member.

In the use of my improved construction, it will be observed that through the interlocking mechanism, the nut 13 is maintained in any desired position upon the threaded portion 10 of the shaft. It will also be observed that through the provision of the slots 15 the controlling member 4 may still be operated in a legitimate manner whenever desired without conflicting with the members 16 and 28 shown in the different forms of my invention. Also, it will be evident that with the nut thus held in position and secured against loss or accidental movement, it is at the same time possible to supply lubricant to the lubricant duct 23 through the lubricant opening 22 in the holding means. Attention is also directed to the fact that by the use of the sealing means including the wire 26 and seal 27 it is possible effectually to protect the friction mechanism against unauthorized and undetected tampering on the part of the operators. In both forms of my invention it will also be observed that the entire protecting means may be manufactured at very small expense and applied to standard friction mechanisms, such as those now in use on mining machines, at low cost, the form of my invention shown in Figs. 1 and 2 requiring only the slotting of the movable member of such a friction, as shown at 15, while the form of my invention shown in Figs. 3 and 4 requires only the provision of a new member 4 having an elongated sleeve thereon, and a slot in said sleeve.

While I have in this application specifically described two forms which my invention may assume in practice, it will be understood that these forms are shown for purposes of illustration and that the invention may be further modified and embodied in various other forms without departing from its spirit or the scope of the appended claims.

What I claim as new and desire to secure by Letters Patent is:

1. In combination, a member, a member movable longitudinally thereon, and spring mechanism therebetween including tensioning means carried by the former and interlocked with and against rotation with respect to the latter in a plurality of positions thereof, said interlocking connection preventing variation of said tensioning means.

2. In combination, a member, a member movable longitudinally thereon, and spring mechanism therebetween including tensioning means on the former having a separable portion interlocked with and against rotation with respect to the latter, said interlocking connection preventing variation of said tensioning means.

3. In combination, a member, a member movable longitudinally thereon, and spring mechanism therebetween including tensioning means on the former having a sealed separable portion interlocked with and against rotation with respect to the latter, said interlocking connection preventing removal of said tensioning means.

4. In a clutch, a member, a spring, a member pressed thereby and movable longitudinally on said first named member, and a rotatable member having operative engagement with said spring being threaded to and adjustable on said first mentioned member and interlocked with and against rotation with respect to said movable member in a plurality of positions thereof, said interlocking connection preventing manipulation of said rotatable member.

5. In a clutch, a support, a spring pressed clutch controlling member movable thereon, and spring tensioning means adjustable on said support and interlocked with and against rotation with respect to said controlling member in a plurality of positions thereof, said interlocking connection preventing adjustment of said tensioning means.

6. In combination, a support, a spring pressed clutch controlling member movable thereon, and spring tensioning means comprising separable elements one adjustable on said support and the other interlocked with said controlling member, said interlocking connection preventing adjustment of the spring tension.

7. In combination, a support, a spring pressed clutch controlling member movable thereon, and spring tensioning means comprising separable sealed elements one adjustable on said support and the other interlocked with said controlling member, said interlocking connection preventing adjustment of the spring tension.

8. Clutch mechanism including a member and a clutch controlling member movable longitudinally thereof, and spring mechanism therebetween including tensioning means carried on said first mentioned member and having a splined connection with said controlling member to prevent adjustment of said tensioning means.

9. Clutch mechanism including a member and a clutch controlling member movable longitudinally thereof and having a longitudinal slot therein, and spring mechanism therebetween including tensioning means on said first mentioned member having a portion entering said slot to prevent adustment of said tensioning means.

10. Clutch mechanism including a member and a clutch controlling member movable longitudinally thereof, and spring mechanism therebetween including tensioning means adapted to be fixedly carried on said first mentioned member and having a splined connection with said controlling member to prevent adustment of said tensioning means.

11. Clutch mechanism including a member and a clutch controlling member movable longitudinally thereof and having a longitudinal slot therein, and spring mechanism therebetween including tensioning means on and adapted to be rotatable relative to said first mentioned member having a portion entering said slot to prevent adustment of said tensioning means.

12. In a clutch, a member, a spring pressed member movable longitudinally thereof and having a slot therein, and a retaining member extending into said slot and being adjustable on said first mentioned member only prior to said slot engagement.

13. In a clutch, a shaft, a spring pressed movable member thereon having a slot therein, spring tensioning means on said shaft, and a retaining member carried on said tensioning means and having a portion extending into said slot.

14. In a clutch, a shaft, a spring pressed movable clutch member thereon having oppositely located longitudinally disposed slots therein, a spring tensioning nut on said shaft, and a retaining member carried by said nut and having portions extending into said slots.

15. In a clutch, a shaft, a nut threaded thereon, a movable clutch member surrounding said shaft and movable longitudinally thereof having longitudinal slots in its end, a spring surrounding said shaft and acting between said nut and member, and a retaining member attached to said nut and having members extending into said slots.

16. In a clutch, a shaft, a longitudinally movable clutch member thereon having a slot in one end thereof, adjustable spring means acting upon said member and including a nut threaded on said shaft, and a retaining member removably attached to said nut and having a portion thereof extending into said slot.

17. In a clutch, a shaft having a threaded end, a movable clutch member having a slotted sleeve, spring means in said sleeve including a nut threaded on said shaft, and a retaining member receivable in said sleeve and attached to said nut having an element extending into said slot.

18. In a clutch, a shaft having a threaded end, a movable clutch member having a slotted sleeve, spring means in said sleeve including a nut threaded on said shaft, and a retaining member attached to said nut in different positions thereof and having a plurality of oppositely located portions each extending into a slot in said clutch member.

19. In a clutch, a shaft having a threaded end a movable clutch member having a slotted sleeve, spring means in said sleeve including a nut threaded on said shaft, a retaining member attached to said nut and having a portion extending into said slot, and means for sealing said retaining member in attached position.

20. In a clutch, a shaft having an axial lubricant aperture therein, a clutch member movable thereon and having a longitudinal slot therein, spring means for said member including a nut on the end of said shaft, and a retaining member attached to said nut having a portion disposed in said slot and provided with a lubricant aperture communicating with the aperture in said shaft.

21. In a clutch, a shaft, a movable clutch member thereon having a slot in one end thereof, adjustable spring means acting upon said member, a retaining member having a portion thereof extending into said slot, means for removably attaching said retaining member to said shaft, and means connecting said attaching means.

22. In a clutch, a shaft, a movable clutch member thereon having a slot in one end thereof, adjustable spring means acting upon said member, a retaining member having a portion thereof extending into said slot, means for removably attaching said retaining member to said shaft, and sealed means connecting said attaching means.

23. In a clutch, a shaft having a threaded end, a movable clutch member having a slotted sleeve, spring means in said sleeve including a nut threaded on said shaft, a retaining member attached to said nut and having an element extending into said slot, and means including a plurality of screws threaded into said nut and a seal breakable upon unauthorized removal of said screws for sealing said retaining member.

24. A clutch mechanism comprising driving and driven members, clutch means therebetween including a hollow member, adjusting means for said clutch disposed within the hollow portion of said member, and means for closing and sealing said hollow portion to prevent any substantial direct access to said adjusting means.

25. A clutch mechanism comprising driving and driven members, clutch means therebetween including a hollow member for controlling engagement thereof, adjusting means for said clutch disposed within the hollow portion of said member, and means for closing and sealing said hollow portion to prevent any substantial direct access to said adjusting means.

26. A clutch mechanism comprising driving and driven members, clutch means therebetween including a hollow member for controlling engagement thereof, adjusting means for said clutch disposed within the hollow portion of said member, and means having operative engagement with the portion of said member surrounding the hollow therein and preventing any direct vertical access to said adjusting means.

In testimony whereof I affix my signature.

ROBERT C. OSGOOD.